2,953,567
5-PHENYLMERCAPTOPYRIMIDINES AND METHOD

George H. Hitchings, Tuckahoe, Elvira A. Falco, New Rochelle, and Barbara Roth, Crestwood, N.Y., assignors to Burroughs Wellcome & Co. (U.S.A.) Inc., Tuckahoe, N. Y., a corporation of New York No Drawing. Filed Nov. 23, 1956, Ser. No. 623,817

6 Claims. (Cl. 260—256.5)

The present invention relates to a novel group of compounds having hypnotic and muscle relaxant activity and particularly to a group of 2,4-diamino-5-phenylmercaptopyrimidines. The hypnotic and muscle relaxant activity of these compounds is quite unexpected since they are lacking in the analogous 2,4-diamino-5-phenoxypyrimidines. These novel pyrimidines may be prepared by the condensation of guanidine with α-phenylmercapto-β-alkoxylacrylonitriles as shown in the following formulas:

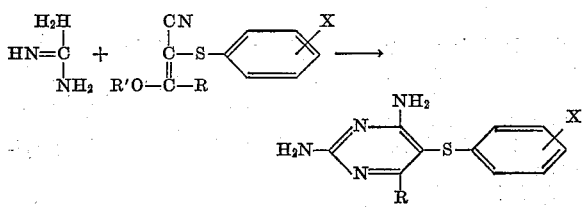

wherein R' is a lower alkyl radical, R is selected from the class consisting of hydrogen and lower alkyl radicals and X is a member of the class consisting of hydrogen, halogen, nitro, alkyl and alkoxyl.

The α-phenylmercaptoacrylonitriles and their precursors, the phenylmercaptoacetonitriles also are new compositions of matter, and their preparation is described herein. The latter are prepared from the phenylmercaptoacetates via the acetamides as indicated below:

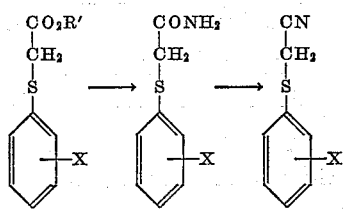

wherein R', and X have the values assigned above.

The condensation of the nitrile with an ester and alkylation of the product, results in a derivative suitable for reaction with guanidine to form the 2,4-diaminopyrimidine.

The 2,4-diamino-5-phenylmercaptopyrimidines are useful as hypnotics and muscle relaxants.

*Phenylmercaptoacetamides.*—These substances were prepared from the corresponding ethylphenylmercaptoacetates by treatment with saturated alcoholic ammonia containing a trace of sodium methoxide. A specific example is given below.

Ethyl p-chlorophenylthioacetate (94 g.) was dissolved in 500 ml. of absolute methanol which had been saturated with ammonia gas at 0°. Further methanol (500 ml.) and a solution of 0.6 g. of sodium in methanol (25 ml.) were added. The solution was allowed to stand 3 days at room temperature, then concentrated in vacuo to about one-half the original volume, cooled and filtered. There was obtained 74 g. of p-chlorophenylthioacetamide melting at 130–131°.

In a similar fashion there were prepared phenylmercaptoacetamide, M.P. 108–109°, o-chlorophenylmercaptoacetamide, M.P. 117–118°; and p-methoxyphenylmercaptoacetamide, M.P. 111–112°.

*Phenylmercaptoacetonitriles.*—The phenylmercaptoacetonitriles were prepared by treatment of the appropriate acetamide with a slight excess of thionyl chloride using benzene as a solvent. The excess reagent (and part of the solvent) was distilled out, the remaining solution was neutralized and dried, and the product was then recovered by evaporation. The following example illustrates this process:

p - Chlorophenylmercaptoacetamide (prepared as above) (37 g.) was dissolved in benzene (150 ml.) and thionyl chloride (33 g., 21 ml.) was added dropwise while the solution was warmed on the water bath to about 50°–60° C. The solution was kept at this temperature for 3 hours, then was poured over ice and an excess of sodium carbonate was added. After 0.5 hour the benzene layer was separated and a second 100 ml. portion of benzene was added, and after shaking, separated and combined with the first. The benzene was evaporated yielding 18 g. of p-chlorophenylmercaptoacetonitrile, M.P. 88°, after washing with petroleum ether and drying. In a similar fashion there were prepared phenylmercaptoactonitrile, o-chlorophenylmercaptoacetonitrile M.P. 166°, and p-methoxyphenylmercaptoacetonitrile M.P. 173°.

α-Phenylmercapto-α-carbonylacetonitriles are prepared as intermediates for the 5-phenylmercaptopyrimidines in two steps from the phenylmercaptoacetonitriles (1) a Claisen condensation with a suitable ester and (2) reaction of the carbonylacetonitrile with a suitable reagent (usually diazomethane) to produce an enol ether. The enol ether is then reacted with guanidine to produce the desired pyrimidine. Usually it is not necessary to isolate the intermediates, and the yields often are superior if the reactions are carried straight through to the final product. However, it is possible to isolate both the carbonylnitriles and the enol ethers if desired. The following examples illustrate the syntheses of several representative pyrimidines.

EXAMPLE 1

*2,4-diamino-5-(p-methylphenylmercapto)-6-methylpyrimidine* p-Methylphenylmercaptoacetonitrile (26 g.) was dissolved in 250 ml. of absolute ethanol in which 7.4 g. of sodium metal had been dissolved and 26 ml. of ethylacetate were added. The solution was heated at reflux temperature for 6 hours. The major part of the alcohol was removed by distillation and the solution was poured into water, made acid and extracted with ether (four times, 200, 100, 100 and 100 ml.). The ether was shaken with solution of sodium bicarbonate, then dried by the addition of anhydrous sodium sulfate. The acetyl derivative (27 g.) was recovered by evaporation of the ether.

The acetyl compound was dissolved in ether (100 ml.) and treated with an ethereal solution of diazomethane (150 ml. from 17 g. of nitrosomethylurea). After standing 4 hours a solution of guanidine (250 ml. prepared by mixing alcoholic solutions of 12.0 g. of guanidine and 3.1 g. of sodium) was added and the solution was heated, at reflux temperature for 7 hours (after first allowing the ether to evaporate away). On cooling the phenylmercaptopyrimidine was obtained as colorless needles melting at 221–121° C. Anal. calcd. for $C_{12}N_4H_{14}S$: C, 58.5; H, 5.7; N, 22.8. Found: C. 58.88; H, 5.43; N, 23.1.

EXAMPLE 2

2,4-diamino-5-p-chlorophenylmercaptopyrimidine

Sodium (4.8 g.), p-chlorophenylmercaptoacetonitrile (19.0 g.) and ethyl formate (20 ml.) were dissolved separately in alcohol and the solutions were mixed giving a final volume of 200 ml. This solution was heated at reflux temperature for 4 hours. The alcohol was removed by distillation and the solution poured into water (500 ml.) and extracted with ether (100 ml., 2 times) then made strongly acid and extracted with ether (200, 100 and 100 ml. portions). The second ethereal extract was shaken with water (100 ml.). Then the ether was evaporated giving 22 g. of formyl derivative. This was treated with the diazomethane from 18.3 g. nitrosomethylurea in 300 ml. of ether and the solution was allowed to stand overnight. This was treated with an alcoholic solution of guanidine from 2.3 g. sodium in 100 ml. of alcohol and 9.5 g. of guanidine hydrochloride in 100 ml. of alcohol and heated on the steam bath. The ether was allowed to boil away, then the flask was fitted with a reflux condenser and heating was continued for 5 hours. At the end of this period the solution was poured into water (500 ml.) the product was recovered by filtration and washed with water. After recrystallization from methanol it melted at 231°.

EXAMPLE 3

2,4-diamino-5-p-chlorophenylmercapto-6-methylpyrimidine 2,4-diamino-5-p-chlorophenylmercapto-6-methylpyrimidine was prepared by the method above using ethylacetate in place of ethylformate. It melts at 223–224°.

EXAMPLE 4

2,4-diamino-5-p-chlorophenylmercapto-6-ethylpyrimidine 2,4-diamino-5-p-chlorophenylmercapto-6-ethylpyrimidine was prepared by the method of Example 2 substituting ethylpropionate for the ethyl formate. It crystallized from methanol in colorless prisms melting at 188–190°.

EXAMPLE 5

2,4-diamino-5-phenylmercapto-6-methylpyrimidine 2,4-diamino-5-phenylmercapto-6-methylpyrimidine was prepared from phenylmercaptoacetonitrile by the procedure of Example 1. It melted at 176–177°.

EXAMPLE 6

2,4-diamino-5-nitrophenylmercapto-6-methylpyrimidine 2,4-diamino-5-nitrophenylmercapto-6-methylpyrimidine was prepared from the compound of Example 3 by nitration. 2,4-diamino-5-phenylmercapto-6-methylpyrimidine. (1.5 g.) was dissolved in concentrated sulfuric acid (15 ml.) and cooled in an ice bath. Powdered potassium nitrate (0.65 g.) was added portionwise with stirring over a period of 15 minutes. The solution then was removed from the bath and allowed to warm slowly to room temperature (3 hours). It then was poured over ice (500 g.) and made basic with an excess of saturated sodium hydroxide solution (40 ml.). On standing yellow plates of the nitrophenyl derivative were deposited.

EXAMPLE 7

2,4-diamino-5-o-chlorophenylmercapto-6-methylpyrimidine 2,4-diamino-5-o-chlorophenylmercapto-6-methylpyrimidine was synthesized from o-chlorophenylmercaptoacetonitrile, ethyl acetate, diazomethane and guanidine as described above for the corresponding p-chloro isomer. It was recrystallized from ethanol and then melted at 206–208°.

EXAMPLE 8

2,4-diamino-5-p-tolylmercapto-6-methylpyrimidine 2,4-diamino-5-p-tolylmercapto-6-methylpyrimidine was prepared from p-tolylmercaptoacetonitrile via α-tolylmercapto-α-acetylacetonitrile according to the method described in Example 1. After recrystallization from absolute ethanol the product melted at 221–222°.

What we claim is:

1. A compound of the formula

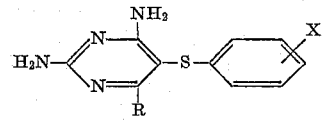

wherein R is selected from the class consisting of hydrogen and lower alkyl radicals, and X is a member of the class consisting of hydrogen, halogen, nitro, lower alkyl and lower alkoxyl radicals.

2. 2,4-diamino-5-(p-methylphenylmercapto)-6-methylpyrimidine.
3. 2,4-diamino-5-p-chlorophenylmercaptopyrimidine.
4. 2,4-diamino-5-p-chlorophenylmercapto-6-methylpyrimidine.
5. 2,4-diamino-5-phenylmercapto-6-methylpyrimidine.
6. 2,4-diamino-5-o-chlorophenylmercapto-6-methylpyrimidine.

References Cited in the file of this patent

UNITED STATES PATENTS

| | | |
|---|---|---|
| 2,602,794 | Hitchings et al. | July 8, 1952 |
| 2,658,897 | Hitchings et al. | Nov. 10, 1953 |
| 2,774,760 | Whitehead | Dec. 18, 1956 |

FOREIGN PATENTS

| | | |
|---|---|---|
| 864,555 | Germany | Jan. 26, 1953 |

OTHER REFERENCES

Conant: The Chemistry of Organic Compounds, p. 264 (1947).

Roth et al: J. Am. Chem. Soc., vol. 73, pp. 2869–71 (1951).